(12) United States Patent
Drewes et al.

(10) Patent No.: US 10,138,967 B2
(45) Date of Patent: Nov. 27, 2018

(54) BRAKING SYSTEM

(71) Applicant: SAF-HOLLAND GmbH, Bessenbach (DE)

(72) Inventors: Olaf Drewes, Aschaffenburg (DE); Frederik Biewer, Haibach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 15/326,362

(22) PCT Filed: Jul. 16, 2015

(86) PCT No.: PCT/EP2015/066235
§ 371 (c)(1),
(2) Date: Jan. 13, 2017

(87) PCT Pub. No.: WO2016/012332
PCT Pub. Date: Jan. 28, 2016

(65) Prior Publication Data
US 2017/0204925 A1     Jul. 20, 2017

(30) Foreign Application Priority Data
Jul. 21, 2014    (DE) ........................ 10 2014 214 098

(51) Int. Cl.
*F16D 65/22*      (2006.01)
*F16D 51/20*      (2006.01)
(Continued)

(52) U.S. Cl.
CPC ............. *F16D 65/22* (2013.01); *F16D 51/20* (2013.01); *F16D 65/09* (2013.01); *F16D 65/46* (2013.01); *F16D 2125/66* (2013.01)

(58) Field of Classification Search
CPC .......... F16D 65/22; F16D 65/09; F16D 65/46; F16D 51/20
See application file for complete search history.

(56) References Cited

U.S. PATENT DOCUMENTS

RE17,899 E    12/1930   Christensen
3,744,595 A     7/1973   Adams
(Continued)

FOREIGN PATENT DOCUMENTS

AU           590284       1/1987
CN         102906443       1/2013
(Continued)

OTHER PUBLICATIONS

European Patent Office; International Search Report; dated Nov. 16, 2015.

*Primary Examiner* — Vishal R Sahni
(74) *Attorney, Agent, or Firm* — Price Heneveld LLP

(57) ABSTRACT

The invention concerns a braking system, especially for wedge-actuated drum brakes, comprising a brake shoe and a wedge unit, wherein the brake shoe comprises a first linking element, wherein the wedge unit comprises a screw element, which is arranged able to turn about an axis of rotation on the wedge unit, wherein the brake shoe comprises a force transmitting portion, which transmits a braking force applied by the wedge unit to the brake shoe, wherein the first linking element comprises a securing portion, which secures the screw element against being twisted about the axis of rotation.

20 Claims, 5 Drawing Sheets

(51) Int. Cl.
    *F16D 65/09*     (2006.01)
    *F16D 65/46*     (2006.01)
    *F16D 125/66*     (2012.01)

(56) References Cited

U.S. PATENT DOCUMENTS

| | | | | |
|---|---|---|---|---|
| 4,369,863 A | * | 1/1983 | Farr | F16D 51/18 |
| | | | | 188/106 A |
| 4,760,897 A | * | 8/1988 | Michoux | F16D 51/22 |
| | | | | 188/79.51 |
| 5,443,135 A | * | 8/1995 | Redgrave | F16D 65/08 |
| | | | | 188/250 F |

FOREIGN PATENT DOCUMENTS

| | | |
|---|---|---|
| DE | 692575 | 4/1930 |
| DE | 629575 | 5/1936 |
| DE | 7246133 | 7/1973 |
| DE | 3441812 | 5/1986 |
| DE | 10 2010 021 393 | 12/2011 |
| EP | 1116896 | 7/2001 |
| GB | 244037 | 5/1925 |
| GB | 2166820 | 5/1986 |
| JP | H0633959 | 2/1994 |

\* cited by examiner

BRAKING SYSTEM

BACKGROUND OF THE INVENTION

The present invention concerns a braking system, especially a wedge-actuated drum brake for use in commercial vehicles.

It is known from the prior art how to organize a readjusting device in braking systems such as for example a wedge-actuated drum brake for commercial vehicles, which compensates for the wear on the brake linings of the brake so as to achieve the most uniform possible braking characteristic even under increasing wear. On this readjusting device there is provided, for example, a screw element, which engages with a corresponding thread and equalizes any wear of the brake linings on the brake shoes of the wedge-actuated drum brake by rotation relative to the thread. In this process, the screw element by its engagement with the thread travels a readjustment path which corresponds substantially to the decrease in thickness of the brake linings. The solutions known from the prior art for preventing a twisting of the screw element of the readjusting device have thus proven to be disadvantageous because unwanted sliding friction occurs on them, which causes a wearing of the components involved, and may also lead to a skewing of the force-transmitting elements of the wedge-actuated drum brakes.

The problem which the present invention proposes to solve is to provide a braking system which combines the functioning of a readjusting device with an optimal force transmission of the braking force under little wear and with the lowest possible weight of the components.

SUMMARY OF THE INVENTION

According to the invention, the braking system, which is preferably designed as a wedge-actuated drum brake, comprises a brake shoe and a wedge unit, wherein the brake shoe comprises a first linking element, wherein the wedge unit comprises a screw element, which is arranged able to turn about an axis of rotation on the wedge unit, wherein the brake shoe comprises a force transmitting portion, which transmits a braking force applied by the wedge unit to the brake shoe, wherein the first linking element comprises a securing portion, which secures the screw element against being twisted about the axis of rotation. Advantageously, the braking system comprises two brake shoes, being arranged on either side of the wedge unit and being separated from each other by an activating force applied by the wedge unit, so that they become engaged with the inside of a brake drum. For the description of the braking system according to the invention, it will be sufficient in the following text to describe the interplay between a brake shoe and the wedge unit. The wedge unit comprises a screw element, which is preferably part of a readjusting device. Especially preferably, the screw element is a bolt-shaped element mounted so that it can rotate on the readjusting device, with an outer thread which engages with a further element of the readjusting device, wherein a rotation of the element corresponding to the screw element leads to a movement of the screw element along an axis of rotation. The wedge unit does not secure the screw element against a twisting about the axis of rotation. Therefore, in the context of the present invention, it is provided that the brake shoe has a first linking element with a securing portion, the securing portion of the first linking element securing the screw element against a twisting about the axis of rotation. Preferably, the brake shoe comprises a first linking element and a second linking element, wherein a securing portion is provided on at least one of the linking elements, preferably therefore on the first linking element. The securing portion is for example a region of the web of the linking element which is suited to come into engagement with the screw element of the wedge unit so that the screw element is secured against twisting about an axis of rotation. Preferably a form-fitting engagement is provided between the securing portion and the screw element. The screw element is preferably a bolt-shaped or (hollow) cylinder-shaped body, having a thread, and especially preferably is part of a readjusting device for a wedge unit of a wedge-actuated drum brake. The first linking element is preferably a sheetlike and curved component which serves especially as a carrier for another curved sheetlike element on which the brake lining of the brake shoe can be attached. The first linking element thus in the context of the present invention advantageously takes on both the role of supporting the so-called lining sheet on which the brake lining is attached or can be attached and the role of preventing the screw element of the wedge unit from being twisted about the axis of rotation. The axis of rotation is advantageously the axis along which the preferably piston-shaped components or elements of the wedge unit are moved, pressing the brake shoe against the inside of the brake drum. Thus, the axis of rotation is also advantageously the axis along which the force is transmitted from the wedge unit to the brake shoe. The screw element is advantageously arranged on a mating component, outfitted with a thread, so that a twisting of the screw element at the same time leads to a displacement of the screw element along the axis of rotation. On the other hand, a twisting of the mating component of the screw element such as for example an adjustment nut upon preventing a twisting of the screw element about the axis of rotation leads to a displacement of the screw element along the axis of rotation. In the context of the present invention, it is provided that the screw element is secured against twisting about the axis of rotation upon engagement of the securing portion, i.e., it does not turn substantially about the axis of rotation, in order to save on components in particular and to accomplish a simple and robust design of the braking system it is provided in the context of the present invention that the securing portion of the first linking element takes on this twist preventing role and thus no additional securing element is required, such as for example a cotter pin. Furthermore, the brake shoe comprises a force transmitting portion, which transmits the braking force applied by the wedge unit to the brake shoe and advantageously presses the latter against the inside of a brake drum. In the context of the present invention, there is thus a separation of roles between the twist prevention of the screw element and the force transmission between wedge unit and brake shoe. Thanks to this separation of roles of twist prevention and force transmission, a wedging of the components involved, such as the first linking element, screw element and force transmitting portion can be prevented in particular. At the same time, the force transmitting portion is optimized for the pure force transmission, i.e., no forces acting about the axis of rotation are transmitted by the force transmitting portion, so that the force transmitting portion only transmits normal forces acting between the wedge unit and the brake shoe. In this way, the wear on the braking system and especially on the force transmitting regions between wedge unit, screw element and brake shoe can be significantly reduced, since less and preferably no unwanted sliding friction occurs between the participating surfaces of the wedge unit and the brake shoe.

Especially preferably, the securing portion has no share in the transmitting of the braking force. In this especially preferred embodiment, the braking force between the wedge unit and the brake shoe is thus transmitted only via the force transmitting portion, while the securing portion of the first linking element has no share in this transmission of the braking force. In this way, it is possible to optimize the securing portion and especially the geometry of the securing portion for the twist prevention, i.e., for the applying of a torque or a circumferential force which prevents the screw element from twisting about the axis of rotation, while the securing portion substantially need not be subjected to any other forces. In this way, in particular, sliding friction on the securing portion and the risk of a skewing of the securing portion on the screw element of the wedge unit can be lessened or even prevented. At the same time, the force transmitting portion on the brake shoe is advantageously optimized for the transmission of normal forces, so that only the braking force is transmitted, while a twist prevention of the screw element is not undertaken by the force transmitting portion of the brake shoe.

Advantageously, the securing portion engages with an engaging portion on the screw element, wherein the engaging portion has a straight extension transverse to the axis of rotation. Preferably, the engaging portion of the screw element is an outer surface of the screw element which is straight or level at least in one direction transverse to the axis of rotation. In other words, this means that the screw element has an outer surface which is designed or suitable as an engaging portion for a preferably form-fitting engagement with the securing portion of the first linking element, wherein this outer surface extends straight or level at least in one direction. A slight curvature can be provided on the engaging portion of the screw element preferably in the directions running transversely to this straight direction of extension, especially in order to be able to absorb a slight pendulum motion of the brake shoe relative to the wedge unit. These slight pendulum motions of the brake shoe occur when the brake shoe during operation of the brake is pressed against the inside of the brake drum and the brake drum broadens out and thereby takes on a slightly conical shape. In this way, the brake shoe in turn experiences a slight slanting. In the context of the present invention, a pendulum motion of the brake shoe is provided in the range of 1 degree to 7 degrees, preferably 2 degrees to 5 degrees, from the swivel plane of the brake shoes and can be easily absorbed by an appropriately designed engaging portion of the screw element. The swivel plane of the brake shoes is preferably the plane along which the brake shoes are moved by the wedge unit and pressed against the brake drum. The designing of the engaging portion to absorb slight pendulum motions of the brake shoe at the same time prevents a skewing of the engaging portion by the securing portion.

In another preferred embodiment, the securing portion and/or the engaging portion has a substantially planar surface. By a planar surface is meant in this context a surface which lies substantially entirely in one plane, or which is congruent or parallel to a plane. Substantially, planar means that manufacturing tolerances and even slight material deformations can cause deviations from the planar geometry during the use of the braking system, although these are permitted in the context of the present invention. Especially preferably, the securing portion has a substantially planar surface, while the engaging portion on the screw element preferably has a straight extension in one direction and a slight curvature in directions lying in each case transversely to this direction, in order to advantageously equalize the pendulum motions of the brake shoe or tilting motions of the brake shoe as described above. In a further especially preferred embodiment, both the securing portion and the engaging portion are in each case provided with a planar surface, wherein the planar surfaces of the securing portion and the engaging portion enable an especially good form fitting and thus ensure an especially secure and reliable twist prevention for the screw element. In other words, a planar surface is to be regarded as a substantially uncurved surface.

Advantageously, the force transmitting portion can be brought to bear against a supporting surface of the screw element, wherein the supporting surface and/or the force transmitting portion extend substantially transversely to the axis of rotation. The phrasing of substantially transversely to the axis of rotation means in the present case that during a swiveling of the brake shoe during the braking process of course a slight tilting of the force transmitting portion in relation to the axis of rotation will occur. The tilt angle occurring in this case should likewise fall within the range of "transversely to the axis of rotation" in the context of the present invention. The supporting surface of the screw element extends preferably perpendicular to the axis of rotation while the force transmitting portion has a surface oriented likewise substantially perpendicular to the axis of rotation, although this is slightly swiveled during the braking process relative to the axis of rotation, starting from the perpendicular to the axis of rotation. The special benefit of the perpendicular orientation of the supporting surface and the corresponding mating surface of the force transmitting portion is a force transmission occurring substantially parallel to the axis of rotation. Advantageously, little or no force component occurs, acting transversely to the axis of rotation. Advantageously, there will be little or no sliding friction or thrust forces acting transversely to the respective force transmission surfaces and the wear on the braking system can be significantly reduced. Thus, the force transmitting portion and the corresponding supporting surface on the screw element is not only independent of the twist prevention of the screw element, but it is also designed such that if possible only normal forces occur to the respective corresponding force transmission surfaces on the force transmitting portion and on the supporting surface, so that the wear due to friction or surface abrasion can be significantly reduced.

Preferably the force transmitting portion comprises a rolling element, which is mounted rotatably on the brake shoe and rolls along the screw element. Especially preferably, the rolling element rolls against the supporting surface of the screw element. The rolling element is preferably held or supported rotatably in the region of the force transmitting portion of the brake shoe and transmits the force applied by the wedge unit to the brake shoe. Especially preferably, the rolling element has a cylindrical or slightly convex or barrel-shaped exterior geometry, and in particular the cylinder or rotation axis of the rolling element is oriented transversely or preferably perpendicular to the axis of rotation of the screw element. The rolling element ensures that the braking force transmitted by the wedge unit and especially preferably by the screw element acts perpendicularly on the rolling element while at the same time the rolling element balances out the swivel motion of the brake shoe during the braking process and only transmits the braking force to the brake shoe when rolling friction occurs. Especially preferably, the rolling element is braced against a plate as the force transmission geometry on the brake shoe, while in the region of the rotary mounting of the rolling element little or none of the braking force is absorbed, advantageously only 1-10% thereof. In this way, the friction of the rolling element in the region of its rotary mounting against the brake shoe or against the first linking element and the second linking element can be reduced. Advantageously, the plate of the brake shoe has a slightly curved shape, so that even upon swiveling of the brake shoe a straight and perpendicular force transmission from the wedge unit to the rolling element and from the rolling element to the plate of the brake shoe, respectively, is always assured. Particularly preferably, the rolling element transmits only a force acting parallel to the axis of rotation from the screw element to the brake shoe. This means, in other words, in particular that the rolling element does not absorb or transmit any torque between wedge unit and brake shoe. Thus, the rolling element advantageously performs no twist prevention of any kind but merely serves to transmit a linear force between the wedge unit and the brake shoe, especially preferably from the screw element to the brake shoe. In this way, the surface wear on the rolling element and a danger of jamming of the rolling element against the screw element during the use of the braking system can be advantageously reduced.

Further preferably, the rolling element is braced against a plate on its side facing away from the screw element, wherein the plate transmits the braking force to the brake shoe that has been transmitted by the rolling element. The rotary guidance of the rolling element on the corresponding mating geometry the brake shoe is preferably designed as an elongated hole, while during the force transmission between the wedge unit and the brake shoe preferably no braking force, or only a negligible fraction of the braking force is taken up by these elongated holes. Advantageously, the plate entirely absorbs the braking force transmitted by the rolling element. In this way, as described above, the friction and the wear can be reduced in the mounting regions for the rotary bearing of the rolling element.

Especially preferably, the braking system comprises a second linking element, wherein the first linking element and the second linking element each have a securing portion, wherein the securing portions are oriented preferably plane symmetrical to a plane situated between the first and the second linking elements. This preferred embodiment constitutes an especially simple design of the braking system in the context of the present invention, wherein a securing portion is provided in a simple manner on each of the two linking elements of a brake shoe, wherein the two securing portions take a corresponding engagement geometry of the screw element with at least two corresponding engaging portions in their center and prevent a twisting by form fitting. It can be especially preferred for the screw element to have a hexagonal surface shape on its outer surface, wherein the securing portions on the first and second linking elements engage each with two oppositely situated surfaces of the engaging portions on the screw element. The securing portions advantageously have planar or straight surfaces at least in one direction, which prevent the screw element from twisting about the axis of rotation. In this way, with only slight modification of the brake shoes of a braking system, one can provide a twist prevention for the screw element of a readjusting device of a wedge unit which on the one hand has slight wear and on the other hand also provides an advantageously designed brake shoe. The preferred brake shoe in the context of the present invention with a first and a second linking element, preferably arranged parallel to the first, has good torsional stiffness, resulting from the very high surface moments of inertia with low weight, preventing both flexing and torsion. Therefore, the brake shoe has good shape stability, even for the large braking forces which are customary in a commercial vehicle.

In an especially preferred embodiment, between the securing portion and the engaging portion there is provided an overlapping region, having an overlapping length measured parallel to the axis of rotation, wherein the overlapping length is 0.5 cm to 8 cm, preferably 0.8 cm to 4 cm and especially preferably around 1 cm to 1.5 cm. The region of the overlapping length proposed here, from 0.5 cm to 8.0 cm, represents the preferred compromise discovered in the context of the invention between an adequate safety against slippage of the twist prevention of the screw element on the one hand and at the same time a maintained low weight for the braking system thanks to avoiding an overdimensioning of the overlapping region between the securing portion and the engaging portion. The lower limit of the overlapping length of 0.5 cm has proven to be a good limit value with which the twist prevention can be assured in a large proportion of the application range with adequate safety.

Preferably, the overlapping length stands in a ratio of 0.2 to 1.2, preferably 0.5 to 1 and especially preferably around 0.6 to 0.75 to a maximum displacement path of the screw element of the activating unit. The maximum displacement path of the screw element in the context of the present invention is preferably the sum of the path resulting from readjustment of the activating unit and the operating path of the screw element. The operating path of the screw element is the path, preferably along the axis of rotation, traveled by the screw element from the commencement of the braking process until reaching the maximum braking force. The maximum displacement path of the screw element generates a certain swiveling of the brake shoe and thus also causes a slanting of the securing portion of the brake shoe relative to the engaging portion on the screw element. In order to have an adequate overlapping length available even in the maximum provided slanting of the securing portion to the engaging portion and thus ensure adequate prevention of twisting of the screw element, a minimum ratio of the overlapping length to the maximum displacement path of 0.2 is preferred. At the same time, an overdimensioning should be avoided, in order to save on weight, and the ratio of overlapping length to maximum displacement path should preferably not exceed the value of 1.2. The preferred ratio range of 0.5 to 1 creates a good compromise between safety and low weight for commercial vehicles and their trailers of medium weight class. The especially preferred ratio range of 0.6 to 0.75 enables an especially good compromise between safety and lightweight construction for heavily loaded commercial vehicles, which are also suited in particular for travel on unpaved roads.

BRIEF DESCRIPTION OF THE DRAWINGS

Further benefits and features of the present invention will emerge from the following description of selected embodiments of the braking system according to the invention in relation to the enclosed figures. Of course, individual features shown only in one figure can also find application in embodiments of other figures, so long as this is not explicitly ruled out or prevented on account of technical circumstances. There are shown:

FIG. 2b) a side view of the screw element shown in FIG. 2a;

DETAILED DESCRIPTION OF THE PREFERRED EMBODIMENTS

Figure 1:
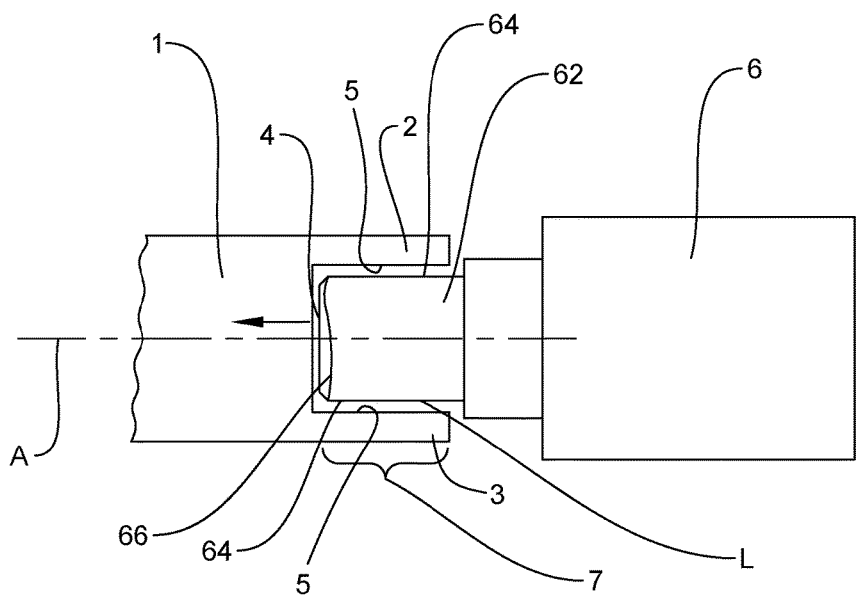
FIG. 1 a schematic view of a preferred embodiment of the braking system according to the invention.

FIG. 1 shows a brake shoe 1 with a first linking element 2, a second linking element 3, a support element 8 and a brake pad 9 wherein the first linking element 2 and the second linking element 3 have a securing portion 5, which is designed for twist prevention of a screw element 62 of a wedge unit 6. The securing portions 5 of the brake shoe 1 preferably engage by form fitting with a correspondingly designed and arranged engaging portion 64 on the screw element 62. The securing portion 5 together with the engaging portion 64 each time forms an overlapping 7 with an overlapping length L. The wedge unit 6 preferably transmits via the screw element 62 a braking force along an axis of rotation A, which in the embodiment shown in the figure preferably points to the left, at the brake shoe 1. For this, the screw element 62 advantageously has a force transmission surface 66, which can be brought into engagement with a corresponding force transmitting portion 4 of the brake shoe. Advantageously, both the force transmitting portion 4 and the force transmission surface 66 are oriented substantially perpendicular to the axis of rotation A.

Figure 2A:
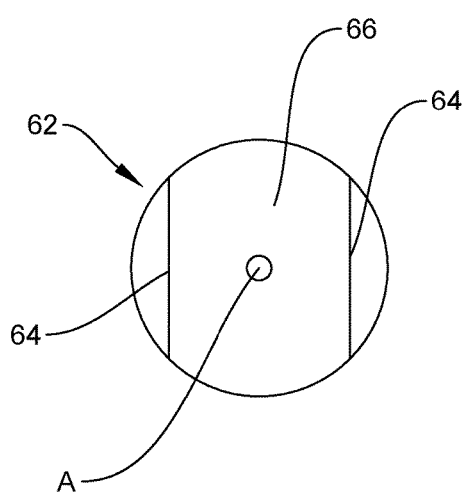
FIG. 2a) a top view of a preferred embodiment of the screw element according to the invention.
Figure 2B:
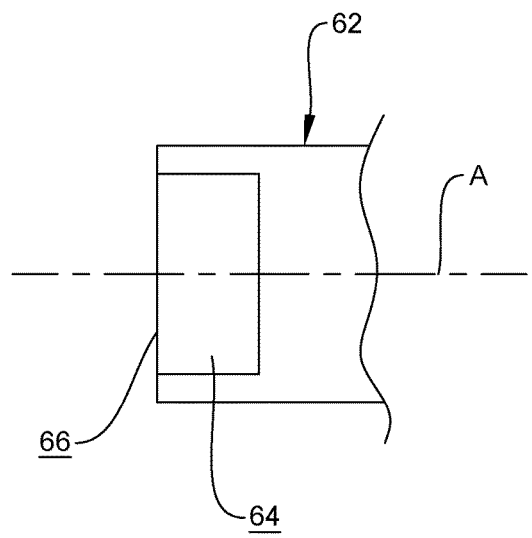

FIG. 2a shows a top view along the axis of rotation A of a preferred embodiment of a screw element 62 according to the invention. This has two engaging portions 64 fashioned plane-symmetrical with respect to each other. Furthermore, the screw element 62 has a supporting surface 66 at the end face of the screw element 62 turned toward the observer. FIG. 2b shows the embodiment of the screw element 62 depicted in FIG. 2a in side view. Here, the extension of the engaging portion 64 is illustrated, being preferably fashioned planar or flat. Thus, in other words, the engaging portion 64 constitutes a local flattening on the otherwise cylindrical or bolt-shaped screw element 62. Alternatively, preferably the screw element 62 has an external geometry fashioned as a hexagon, especially an external hexagon, wherein an engagement with the securing portion 5 in different installation positions of the screw element 62 is possible.

Figure 3:
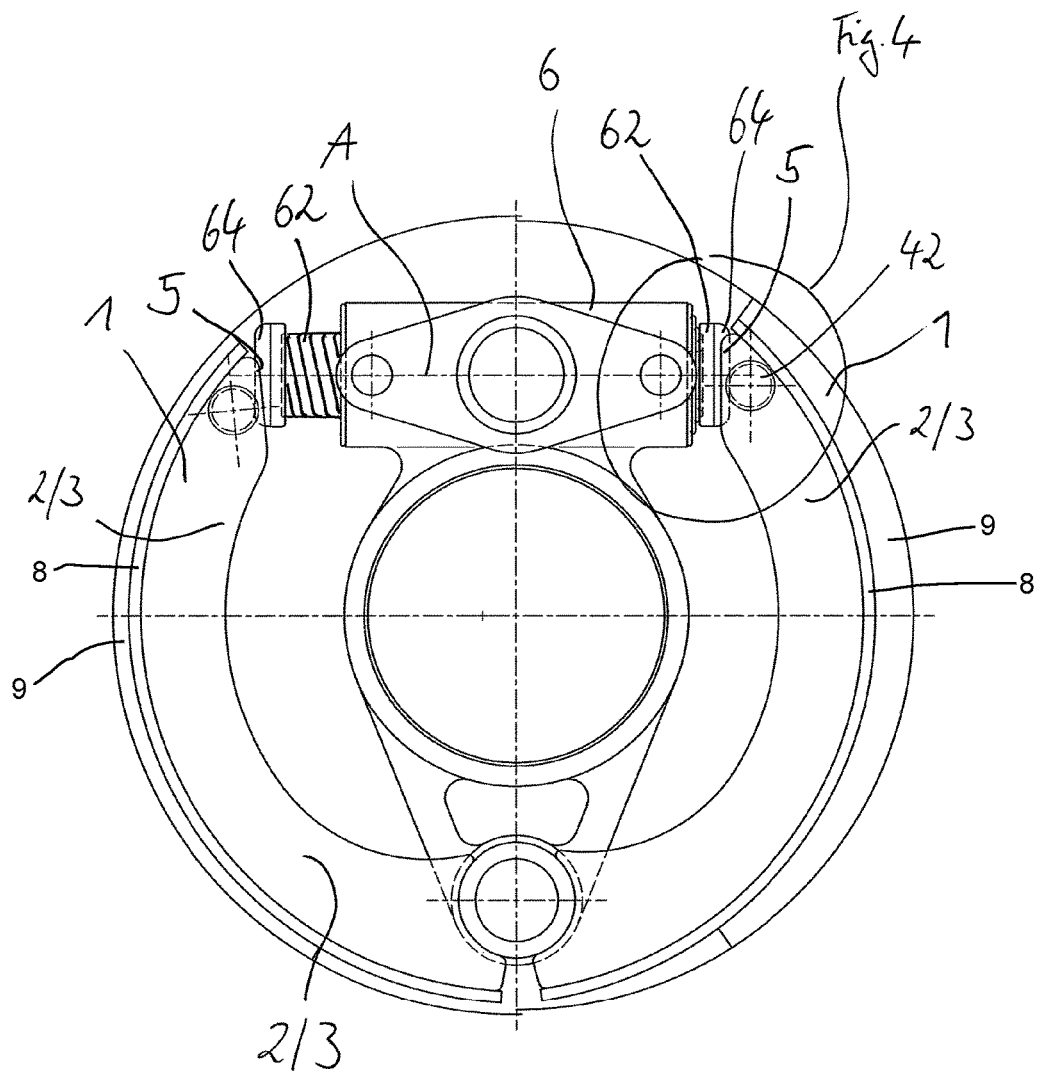
FIG. 3 a view of a preferred embodiment of the braking system according to the invention.

FIG. 3 shows a preferred embodiment of the braking system, illustrating that the wedge unit can be brought into engagement with two brake shoes 1 arranged to the right and left of it. The brake shoe 1 on the left side of the figure is shown in its maximum worn state, while the right brake shoe 1 is outfitted with fresh brake linings and thus is situated closer to the wedge unit 6 than the brake shoe 1 shown to the left. Between the first linking element 2 turned toward the observer and the engaging portion 64 of the screw element 62 of the wedge unit 6 there is provided an overlapping region 7 (see FIG. 4), in which the securing portion 5 of the first linking element 2 stands in form-fitting engagement with the screw element 62. In this way, the screw element 62 is prevented from twisting about the axis of rotation A. Furthermore, it is shown preferably that the wedge unit 6 is secured to a brake carrier and preferably fashioned as a single piece with it, and is secured via the brake carrier to the axle of a commercial vehicle.

Figure 4:
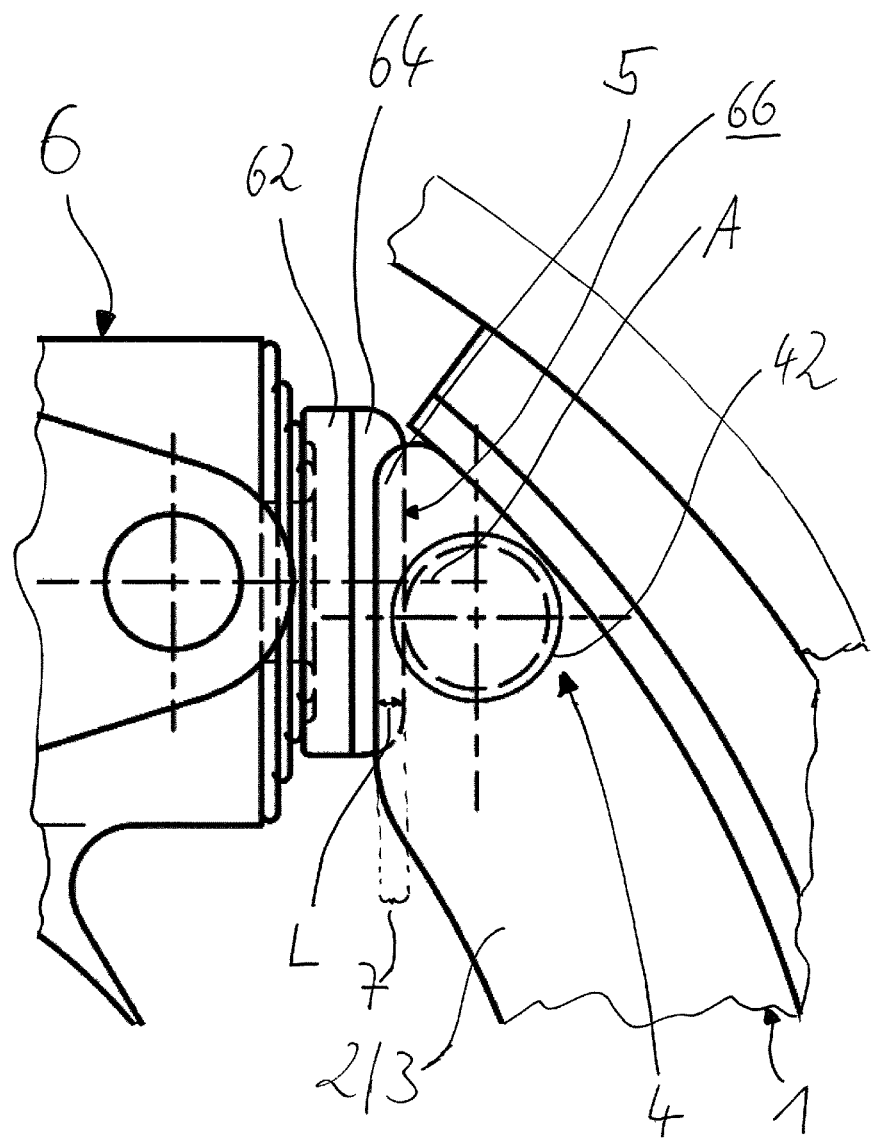
FIG. 4 the detail view indicated in FIG. 3 in magnified representation.

FIG. 4 shows a detail view of the embodiment of FIG. 3. In particular, the engagement region between the brake shoe 1 and the wedge unit 6 is illustrated, in which the screw element 62 of the wedge unit 6 transmits an activating force to the force transmitting portion 4 of the brake shoe 1. The screw element 62 has an engaging portion 64, with which the securing portion 5 of the first and/or the second linking element 2, 3 engages to prevent the screw element 62 from twisting about the axis of rotation A. In the force transmitting portion 4 of the brake shoe 1 there is preferably arranged a rolling element 42, which transmits the force applied by the wedge unit 6 along the axis of rotation A to the brake shoe 1, preferably to the first and the second linking elements 2, 3. For this, the rolling element 42 is braced preferably in rolling manner against the supporting surface 66 of the screw element 62, the preferred rolling movement of the rolling element 42 against the supporting surface 66 causing less friction and wear than the otherwise occurring sliding friction.

Figure 5A:
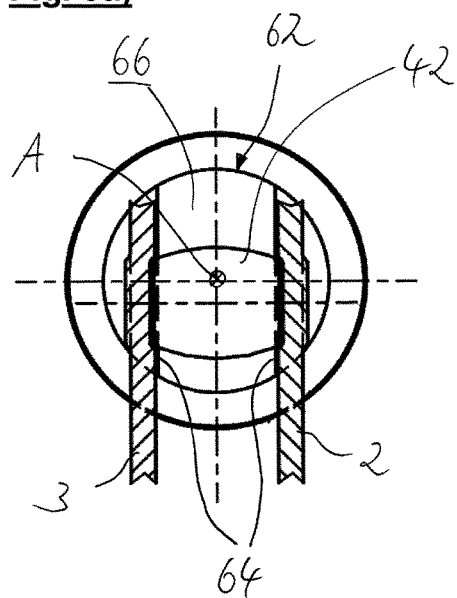
FIG. 5a)-c) partial sectional views of further preferred embodiments of the braking system according to the invention.
Figure 5B:
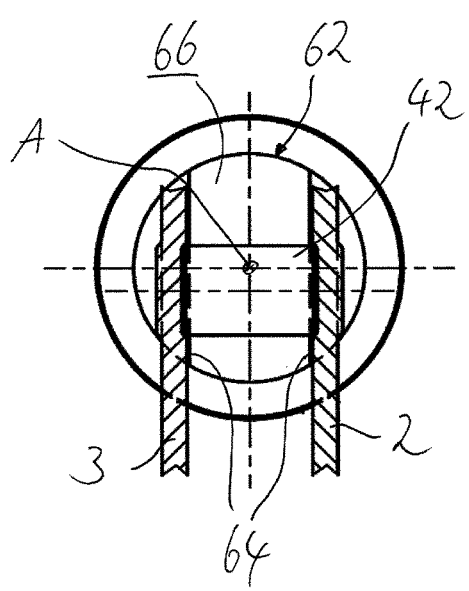
Figure 5C:
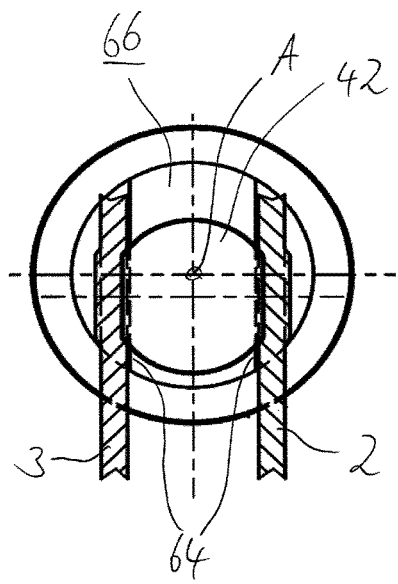

FIG. 5a)-c) show preferred embodiments of the rolling element 42. The rolling element 42 in FIG. 5a) is slightly barrel-shaped and in FIG. 5b) it is cylindrical and in FIG. 5c) it is approximately spherical. In all four representations the rolling element engages with the supporting surface 66 of the screw element 62. At the same time, the first linking element 2 and the second linking element 3 prevent the screw element 62 from twisting about the axis of rotation A, turned toward the observer.

Figure 6:
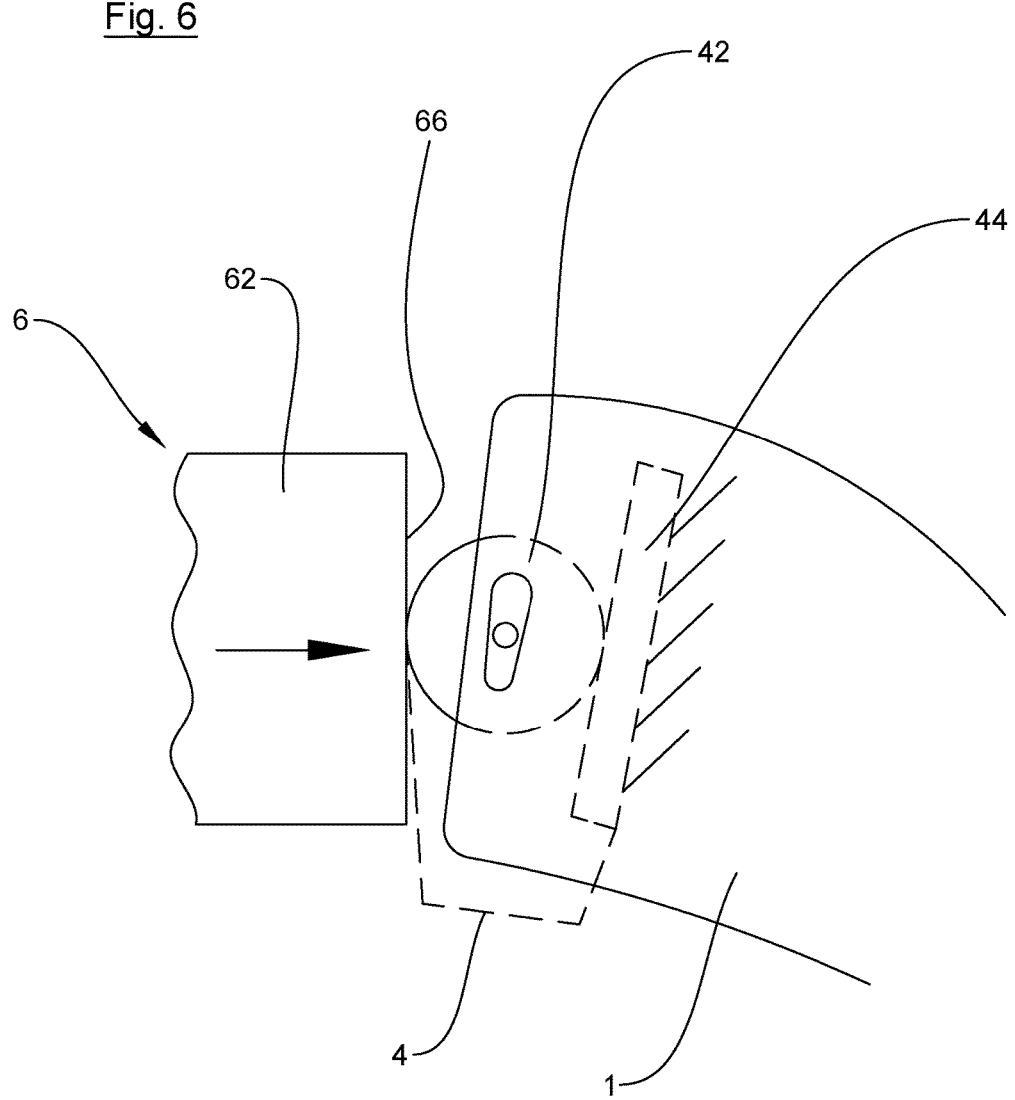
FIG. 6 a schematic view of another preferred embodiment of the braking system according to the invention.

FIG. 6 shows a schematic view of another preferred embodiment of the braking system according to the invention, wherein a plate 44 is provided at the force transmitting portion 4 of the brake shoe 1, against which a rolling element 42 is braced. On its side opposite the plate 44, the rolling element is preferably subjected to a force by the activating unit 6. In the subsequent displacement and swiveling of the brake shoe 1, the rolling element 42 rolls against both the plate 44 and the supporting surface 66, and preferably no sliding friction occurs, but only a rolling friction. In order to allow the displacement of the rolling element 42 relative to the brake shoe 1, the rolling element 42 is mounted in a recess fashioned as an elongated hole on the first linking element 2 and/or on the second linking element 3.

The rolling element 42 is preferably loosely guided in the elongated hole so that the transmission of the force from the activating unit 6 to the brake shoe 1 occurs substantially only via the supporting surface 66 and the plate 44.

LIST OF REFERENCE NUMBERS

1—Brake shoe
2—First linking element
3—Second linking element
4—Force transmitting portion
42—Rolling element
44—Plate
5—Securing portion
6—Activating unit
62—Screw element
64—Engaging portion
66—Supporting surface
7—Overlapping region
L—Overlapping length
A—Axis of rotation

The invention claimed is:

1. A braking system, comprising:
   a first brake shoe;
   a wedge unit;
   wherein the first brake shoe comprises a sheetlike, curved first linking element;
   wherein the wedge unit comprises a screw element which is arranged on the wedge unit and rotatable relative to the wedge unit about an axis of rotation;
   wherein the first brake shoe further comprises a force transmitting portion which transmits a braking force applied by the wedge unit to the first brake shoe; and
   a sheetlike, curved second linking element, wherein the first and second linking elements support a sheetlike, curved support element configured to support a brake pad of the first brake shoe thereon;
   wherein the first linking element and the second linking element each comprise a securing portion which secures the screw element against being twisted about the axis of rotation relative to the brake shoe;
   wherein the securing portions are configured and oriented plane symmetrical to a plane situated between the first linking element and the second linking element; and
   wherein the wedge unit is configured to engage the first brake shoe positioned on a first side of the wedge unit and a second brake shoe positioned on a second side of the wedge unit located opposite the first side.

2. The braking system as claimed in claim 1, wherein the securing portions have no share in the transmitting of the braking force.

3. The braking system as claimed in claim 2, wherein each securing portion engages with an engaging portion on the screw element, and wherein the engaging portion is another surface of the screw element which has a straight extension transverse to the axis of rotation.

4. The braking system as claimed in claim 3, wherein each securing portion and the corresponding engaging portion has a substantially planar surface.

5. The braking system as claimed in claim 4, wherein the force transmitting portion is configured to be brought to bear against a supporting surface of the screw element, and wherein at least one of the supporting surface and the force transmitting portion extend substantially transversely to the axis of rotation.

6. The braking system as claimed in claim 5, wherein the force transmitting portion comprises a rolling element which is mounted rotatably on the brake shoe and is configured to roll along the screw element.

7. The braking system as claimed in claim 6, wherein the rolling element transmits only a force acting parallel to the axis of rotation from the screw element to the brake shoe.

8. The braking system as claimed in claim 7, wherein the rolling element is braced against a plate on a side of the rolling element facing away from the screw element, and wherein the plate transmits the braking force to the brake shoe that has been transmitted by the rolling element.

9. The braking system as claimed in claim 8, wherein an overlapping region is located between each securing portion and the corresponding engaging portion, the overlapping region having an overlapping length measured parallel to the axis of rotation, and
   wherein the overlapping length is within the range 0.5 cm to 8 cm.

10. The braking system as claimed in claim 9, wherein the overlapping length is within the range of 0.8 cm to 4 cm.

11. The braking system as claimed in claim 10, wherein the overlapping length is within the range of 1 cm to 1.5 cm.

12. The braking system as claimed in claim 1, wherein each securing portion engages with an engaging portion on the screw element, and wherein the engaging portion has a straight extension transverse to the axis of rotation.

13. The braking system as claimed in claim 12, wherein at least one of the securing portions and the engaging portions have a substantially planar surface.

14. The braking system as claimed in claim 1, wherein the force transmitting portion is configured to be brought to bear against a supporting surface of the screw element, and wherein at least one of the supporting surface and the force transmitting portion extend substantially transversely to the axis of rotation.

15. The braking system as claimed in claim 1, wherein the force transmitting portion comprises a rolling element which is mounted rotatably on the brake shoe and is configured to roll along the screw element.

16. The braking system as claimed in claim 15, wherein the rolling element transmits only a force acting parallel to the axis of rotation from the screw element to the brake shoe.

17. The braking system as claimed in claim 15, wherein the rolling element is braced against a plate on a side of the rolling element facing away from the screw element, and wherein the plate transmits the braking force to the brake shoe that has been transmitted by the rolling element.

18. The braking system as claimed in claim 1, wherein an overlapping region is located between each securing portion and the corresponding engaging portion, the overlapping region having an overlapping length measured parallel to the axis of rotation, and
   wherein the overlapping length is within the range 0.5 cm to 8 cm.

19. The braking system as claimed in claim 18, wherein the overlapping length is within the range of 0.8 cm to 4 cm.

20. The braking system as claimed in claim 19, wherein the overlapping length is within the range of 1 cm to 1.5 cm.

* * * * *